United States Patent
Richeton et al.

(10) Patent No.: US 9,616,934 B2
(45) Date of Patent: Apr. 11, 2017

(54) HYBRID AUTOMOTIVE SIDE SILL AND MANUFACTURING METHOD THEREOF

(71) Applicants: HYUNDAI MOTOR COMPANY, Seoul (KR); Hyundai Motor Europe Technical Center GmbH, Russelsheim (DE); KIA Motors Corporation, Seoul (KR)

(72) Inventors: Julien Richeton, Frankfurt am Main (DE); Hermann Hansen, Minden (DE); Stephane Ringenbach, Frankfurt am Main (DE)

(73) Assignees: HYUNDAI MOTOR COMPANY, Seoul (KR); KIA MOTORS CORPORATION, Seoul (KR); HYUNDAI MOTOR EUROPE TECHNICAL CENTER GMBH, Russelsheim (DE)

(*) Notice: Subject to any disclaimer, the term of this patent is extended or adjusted under 35 U.S.C. 154(b) by 0 days.

(21) Appl. No.: 14/835,364

(22) Filed: Aug. 25, 2015

(65) Prior Publication Data

US 2016/0264190 A1 Sep. 15, 2016

(30) Foreign Application Priority Data

Mar. 12, 2015 (DE) .................. 10 2015 204 494

(51) Int. Cl.
*B62D 25/02* (2006.01)
*B62D 29/00* (2006.01)

(52) U.S. Cl.
CPC ......... *B62D 25/025* (2013.01); *B62D 29/005* (2013.01)

(58) Field of Classification Search
CPC ............................. B62D 25/025; B62D 29/005
See application file for complete search history.

(56) References Cited

U.S. PATENT DOCUMENTS

2014/0316063 A1   10/2014   Hochstetter et al.

FOREIGN PATENT DOCUMENTS

| JP | H05-338447 A    | 12/1993 |
|----|-----------------|---------|
| JP | H09-030452 A    | 2/1997  |
| JP | 2003-081130 A   | 3/2003  |
| JP | 2012-126188 A   | 7/2012  |
| JP | 2014-004850 A   | 1/2014  |
| JP | 2014-091462     | 5/2014  |
| KR | 10-0158988      | 12/1998 |
| KR | 2010-0158988    | 12/1998 |
| KR | 10-2004-0019443 A | 3/2004 |
| KR | 10-1118687      | 3/2012  |

(Continued)

*Primary Examiner* — Lori L Lyjak
(74) *Attorney, Agent, or Firm* — Brinks Gilson & Lione

(57) ABSTRACT

The present disclosure provides a hybrid side sill for an automobile. The hybrid side sill may includes a pultruded profile part including a continuous fiber reinforced thermoplastic polymer, which has a heat deflection temperature of at least 200 °C., and a terminal part including steel, which is attached to an end portion of the pultruded profile part. The present disclosure further provides an automobile body including such a hybrid side sill and also a method of manufacturing a hybrid side sill for an automobile. The manufacturing method includes a step for forming a pultruded profile part including a continuous fiber reinforced thermoplastic polymer, which has a heat deflection temperature of at least 200 °C., and a step for attaching a terminal part made of steel to an end portion of the pultruded profile part.

11 Claims, 3 Drawing Sheets

(56) References Cited

FOREIGN PATENT DOCUMENTS

| KR | 2010-1118687 | 3/2012 |
| KR | 10-2014-0012972 A | 2/2014 |
| KR | 10-2014-0024870 A | 3/2014 |
| KR | 10-2014-0081837 A | 7/2014 |

HYBRID AUTOMOTIVE SIDE SILL AND MANUFACTURING METHOD THEREOF

PRIORITY STATEMENT

This application claims the benefit of German Patent Application No. DE 10 2015 204494.7, filed on Mar. 12, 2015, and incorporates the German Patent Application by reference herein in its entirety.

FIELD

The present disclosure relates to a hybrid side sill for an automobile, an automobile body including a hybrid side sill and a method for manufacturing a hybrid side sill.

BACKGROUND

The statements in this section merely provide background information related to the present disclosure and may not constitute prior art.

Typically, both side portions of an automobile body include a roof edge disposed in the upper section of the automobile body, a side sill disposed in the lower section of the automobile body, and pillars that connect the roof edge and the side sill, whereby a framework for a passenger compartment is formed. Thus, the side sills contribute to the passenger compartment framework and determine the stiffness of the automobile body, both during normal use and in case of a crash involving a frontal impact, an offset impact, or a side impact wherein generally the side sill receives an overload. For example, the deformation of the passenger compartment framework of an automobile that occurs when another vehicle collides against the side thereof needs to be restrained to a minimum level, and the reinforcement of the side sill plays a crucial role.

In automobiles currently manufactured, side sills are typically made of steel, being assembled with additional parts such as crash boxes for absorbing impact energy. While steel has the strength and stiffness required, it is also heavy and therefore contributes significantly to the overall weight of the automobile. In order to reduce weight, some recently marketed automobiles include side sills made of carbon-fiber reinforced plastics such as epoxy and vinyl ester. However, due to the different physical properties of these materials as compared to steel, existing manufacturing lines for automobile bodies can no longer be used or have to be modified in complex ways.

For example, whereas in conventional manufacturing methods an automotive body including steel side sills is first assembled into a so-called body in white, which then undergoes painting and baking at a temperature approximately 190° C., side sills comprising epoxy or vinyl ester, which are stable only up to a temperature of approximately 120° C., can be mounted to the automobile body only in a separate assembly procedure after baking has completed and furthermore require a separate painting process using a non-baked paint of generally lower durability.

SUMMARY

According to implementations of the present disclosure, a hybrid side sill for an automobile includes a pultruded profile part comprising a continuous fiber reinforced thermoplastic polymer, which has a heat deflection temperature of at least 200° C., and a terminal part comprising steel, which is attached to an end portion of the pultruded profile part. The reinforcing fibers may comprise e.g. carbon fibers, glass fibers, aramid fibers or the like. The heat deflection temperature (HDT) is the temperature at which a polymer or plastic sample deforms under a specified load. It is determined by the test procedure outlined in DIN EN ISO 75-1,-2,-3.

The pultruded profile part may be manufactured under the heat deflection temperature of at least 200° C. by a suitable pultrusion process known in the art. For example, US 2014 316063 A1 discloses a suitable process for the manufacture of a composite material, the composite material comprising an assemblage of one or more synthetic reinforcing fibers, which is impregnated with at least one thermoplastic polymer having a glass transition temperature "Tg" of greater than or equal to 80° C., said process comprising: i) a stage of impregnation of said assemblage with a precursor composition in the molten state (after melting), the impregnation being carried out at a temperature such that the viscosity of said precursor composition in the molten state does not exceed 100 Pa·s, with said precursor composition comprising: a) at least one prepolymer P(X)n of said thermoplastic polymer, comprising a molecular chain P having, at its ends, n identical reactive functional groups X, said prepolymer being of semiaromatic and/or semicycloaliphatic structure, with X being a reactive functional group from: OH, NH2 or COOH, with n ranging from 1 to 3, b) at least one chain extender, which can be represented by Y-A-Y, comprising two identical Y functional groups which react with at least one of said X functional groups, ii) a stage of bulk polymerization by (poly)addition in the molten state of said prepolymer with said chain extender, with said thermoplastic polymer being the result of said bulk polymerization by polyaddition.

Because automotive side sills are of generally elongate shape, forming the side sill comprising the pultruded profile part enables a large proportion of the side sill to be formed of the pultruded profile part, such that due to the generally high strength-to-weight ratio of continuous fiber reinforced thermoplastic polymer the entire side sill is enabled to be provided at a lower weight than a conventional steel side sill of corresponding strength. Because the side sill according to implementations of the present disclosure include the terminal part comprising steel, mounting features such as holes, threads etc. for mounting the side sill to the automobile body are enabled to be provided with the same degree of freedom as in conventional steel side sills. Because of this and because the heat deflection temperature of the pultruded profile part is above 190° C., the side sill according to implementations of the present disclosure is enabled to be assembled with an automobile body-in-white, i.e. to be assembled with an unpainted automobile body at a manufacturing stage before the automobile body is to be passed through a painting and paint-baking process, such as is conventionally carried out at a typical baking temperature of 190° C.

According to one form of the present disclosure, the continuous fiber reinforced thermoplastic polymer has a heat deflection temperature of at least 220° C., enabling the side sill to withstand particularly high loads without deforming during a conventional paint-baking process. In another form, the continuous fiber reinforced thermoplastic polymer has a heat deflection temperature of at least 230° C.

According to another form, the thermoplastic polymer comprises a semi-aromatic pol-yamide. Semi-aromatic polyamides contain aromatic rings in their backbones, which gives them particularly high mechanical strength and thermal resistance. In other forms, the thermoplastic polymer is a polyphthalamide (PPA) or high-performance polyamide wherein 60% or more moles of the carboxylic acid portion of the repeating unit in the polymer chain is composed of a combination of terephthalic (TPA) and isophthalic (IPA) acids.

According to another form, the terminal part is glued to the pultruded profile part, enabling a simple and reliable connection between the terminal part and the pultruded profile part. In still another form, the terminal part is glued to the pultruded profile part by using a one-component epoxy glue, which is easily handled and has a particular high strength and thermal resistance compatible with a paint-baking process.

According to one aspect of the present disclosure, the hybrid side sill further includes at least one metal bracket attached to the pultruded profile part. This enables a greater stability of the pultruded profile part as well as providing additional functionality such as for further connecting the side sill with the automobile body. In another form, the at least one metal bracket is inserted within a convex profile portion of the pultruded profile part, thus improving stability and compactness.

According to another form of the present disclosure, at least one crash can comprising steel or/and a plastic material, which may include continuous or short-length reinforcement fibers, is attached to the pultruded profile part. This enables the side sill to particularly effectively absorb energy in the event of a side crash of the automobile. In another form, the at least one crash can is attached within a convex profile portion of the pultruded profile part, thus enhancing compactness as well as particular stability of the side sill during a crash.

The automobile body according to implementations of the present disclosure comprises at least one hybrid side sill such as described above, the automobile body being covered with a paint layer baked at a baking temperature of at least 190° C. In this way, a high-quality paint layer covering the entire automobile body including the at least one side sill is provided.

The present disclosure provides manufacturing methods by which the pultruded profile part is formed by reactive pultrusion involving polyaddition of chain extenders. That is, pultrusion is performed by using a pultrusion die wherein a polymerization by polyaddition reaction is performed in the molten state of a prepolymer with a chain extender, such as an oligomer. In this way, the finished pultruded profile part is enabled to be formed with the thermoplastic polymer having long chains providing great mechanical strength while during pultrusion the prepolymer is enabled to be provided in the molten state with low viscosity, enabling reliable wetting of the reinforcement fibers and therefore a strong bond between the resulting thermoplastic polymer and the reinforcement fibers. In one form, the chain extenders comprise at least one aromatic ring. This enables the thermoplastic polymer to contain aromatic rings in the molecule backbones, which gives the thermoplastic polymer particularly high mechanical strength and thermal resistance.

According to another form, a pultrusion die used for performing the reactive pultrusion is heated to a die temperature of between 200° C. and 340° C. This enables the impregnation and polymerization conditions to be controlled in order to have a low impregnation viscosity.

In still another form, at least one crash can comprising a fiber reinforced thermoplastic polymer is attached to the pultruded profile part. In other form, the at least one crash can is formed by pultrusion, in particular by pullwinding or pullbraiding, which enables high capability of absorbing crash energy at a low weight.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
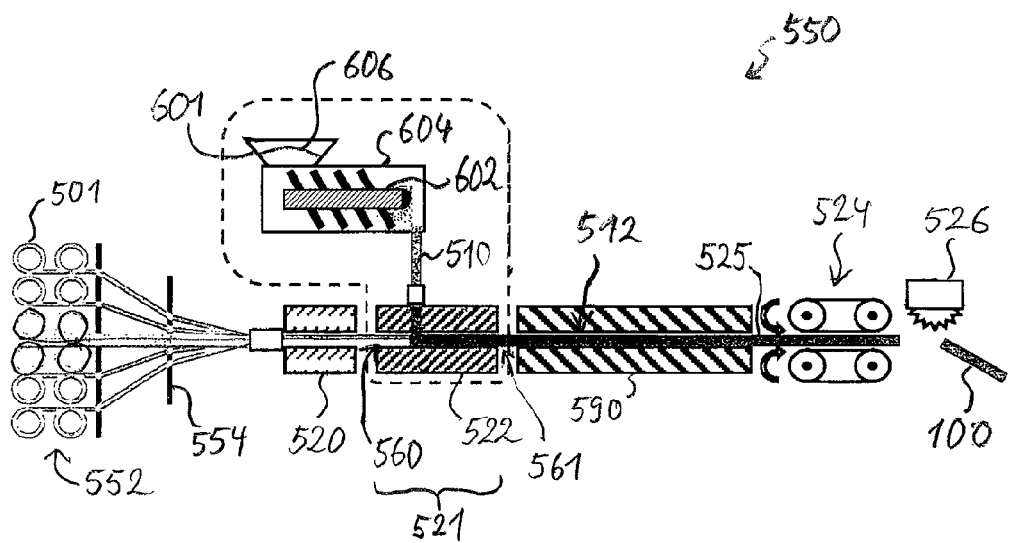
FIG. 1 is a schematic front view of a pultrusion apparatus performing a profile pultrusion step of a manufacturing method according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
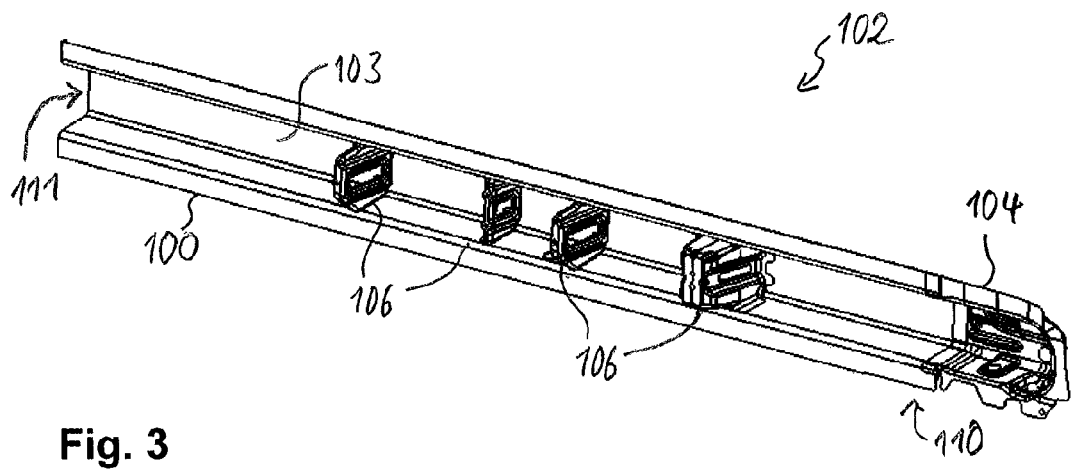
FIG. 3 is a perspective drawing of an automotive hybrid side sill which results from the assembly step of FIG. 2.

FIG. 3 shows, in a perspective view, a hybrid side sill 102 for an automobile vehicle. The hybrid side sill 102 is of elongate shape and includes a pultruded profile part 100 extending along the major proportion of the overall length of the hybrid side sill 102. The profile part 100 has an Ω-shaped or hat-shaped profile and comprises a thermoplastic polymer reinforced by layers of carbon fibers and glass fibers (not shown), which longitudinally extend along the entire length of the profile part 100. In the present form, the thermoplastic polymer is assumed to be a polyphthalamide (PPA) or high-performance polyamide. The material of the pultruded profile part 100 has a heat deflection temperature of 220° C.

The hybrid side sill 102 further includes a terminal part 104 comprising steel, which is glued to an end portion 110 of the pultruded profile part 100 using an one-component epoxy glue (not shown). In the terminal part 104, mounting features such as holes and slits for mounting the hybrid sill 102 with an automobile body are formed. Additionally, the hybrid side sill 102 includes four metal brackets 106, which are glued into a convex profile portion 111 of the Ω-shaped profile of the pultruded profile part 100 in order to stabilize the profile part 100 and absorb energy in the event of a side crash.

Next, a method for manufacturing the hybrid side sill 102 in FIG. 3 as well as an automobile body 108 including the hybrid side sill 102 shall be explained by making reference to FIGS. 1 through 5.

FIG. 1 shows a polyamide high-temperature pultrusion apparatus 550 for manufacturing the pultruded profile part 100 of the hybrid side sill 102 in a schematic front view. The pultrusion apparatus 550 includes a fiber material storage device 552, where fiber material for the layers of reinforcement fibers is kept on respective spools 501, an alignment device 554 for aligning the fiber material according to the intended relative arrangement of the reinforcement fibers within the pultruded profile part 100 to be manufactured, a pre-heating device 520 for pre-heating the aligned fiber material, a heated extruder 604 with a screw shaft 602 arranged inside and linked to a hopper 601 containing solid pellets of an oligomer 606 required to form a molten precursor 510 of the thermoplastic polymer 512, a pultrusion die 522 equipped with a heating device 521 and having an internal profile corresponding to the desired external profile of the pultruded profile part 100 to be manufactured, a puller device 524 for pulling a composite strand 525 formed of the fiber material and thermoplastic polymer resin from the pultrusion die 522, thereby driving the manufacturing process, and a cutter device 526 for cutting the composite strand 525 into segments of a desired length of the pultruded profile part 100 to be manufactured.

In preparation of operation, the fiber material stored on the spools 501 is successively guided through the alignment device 554, the pre-heating device 520, the pultrusion die 522, the puller device 524, and the cutter device 526. Also, the hopper 601 is filled with the pellets of oligomer 606 required to form the thermoplastic polymer 512, which are selected and prepared in such a way that each oligomer (short polymer) 606 comprises at least one aromatic ring. The extruder 604 is heated to a temperature sufficiently high to provide the oligomers 606 in liquid condition, e.g. to a temperature that lies 10 K or more above the melting temperature of the pellets of oligomer 606.

To start a pultrusion step for manufacturing the pultruded profile part 100, the fiber material is continuously or intermittently pulled by the puller device 524 out of the pultrusion die 522, causing fiber material in corresponding quantity to be drawn from the storage device 552. After having been aligned in the alignment device 554, the fiber material is pre-heated while passing through the pre-heating device 520 such as to enter the pultrusion die 522 at an elevated temperature. Simultaneously, pellets of oligomer 606 are introduced from the hopper 601 into the extruder 604 where they are melted to form a molten precursor 510, which is fed into the pultrusion die 522 at a position close to its entrance 560 into which the fiber material is being drawn by the action of the puller device 524. In one form, the molten precursor 510 before entering the pultrusion die 522 is melted and transported to the pultrusion die 522 at a temperature sufficiently low to inhibit further polymerization of the oligomers 606 from occurring to a significant extent, in this way maintaining a low viscosity of the molten precursor 510, which in the present form is assumed to be 2 Pa·s.

Upon entering the pultrusion die 522, the molten precursor 510 impregnates the fiber material, entering even minute cavities between the fibers and thoroughly wetting the surface of the fibers due to its low viscosity. While the puller device 524 continues to draw the fiber material with the molten precursor 510 having impregnated the fibers through the pultrusion die 522, the heating device 521 maintains a temperature profile within the pultrusion die 522 that causes the molten precursor 510 to sufficiently polymerize by polyaddition of oligomers 606 along the path of the impregnated fiber material through the pultrusion die 522, with polymerization starting first close to the surface of the fibers due to the fiber material having undergone pre-heating in the pre-heating device 520. In the present form, a die temperature of 350° C. is assumed to be maintained along the path of the impregnated fiber material through the pultrusion die 522 in order to enable polymerization by polyaddition of the oligomers 606 within a polymerization time span of 30 s. As a result, a composite strand 525 having the composition and profile of the pultruded profile part 100 to be manufactured continuously leaves the pultrusion die 522 at its exit 561, where it is cut by the cutter device 526 to repeatedly provide the pultruded profile part 100.

The oligomers 606 to form the molten precursor 510 may be prepared in various ways, provided that no polymerization happens while being transported as molten precursor 510 in molten condition while the molten precursor 510 is capable to undergo in-situ polymerization by polyaddition of the oligomers 606 into a thermoplastic polymer resin after having entered the pultrusion die 522, resulting in a composite strand 525 which has a desired heat deflection temperature of at least 200° C., in the present form assumed to be 220° C. For example, oligomers for forming a polyphthalamide (PPA) or high-performance polyamide as in the present form may be chosen. In alternative forms of the manufacturing method, more than two components such as e.g. a prepolymer and a chain extender to be polyadded to the prepolymer may be mixed to form the molten precursor.

Figure 2:
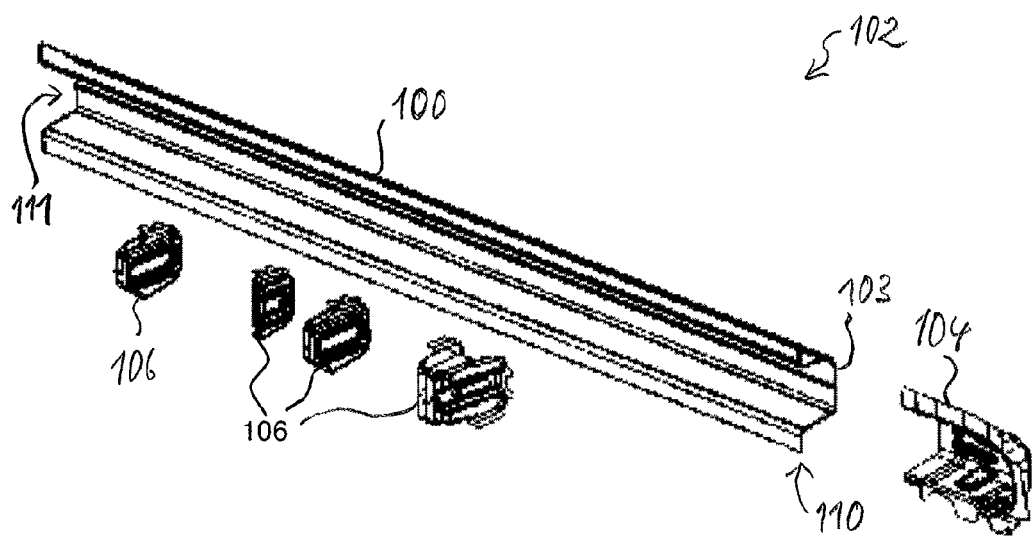
FIG. 2 is an explosion diagram of an automotive hybrid side sill according to one form of the present disclosure, illustrating an assembly step of the manufacturing method.

FIG. 2 illustrates a subsequent side sill assembly step of the method for manufacturing the hybrid side sill 102. In the assembly step, the terminal part 104 comprising steel is glued to an end portion 110 of the pultruded profile part 100 using a one-component epoxy glue (not shown). Furthermore, the four metal brackets 106 are glued into the convex profile portion 111 of the profile of the pultruded profile part by using the one-component epoxy glue. The hybrid side sill 102 resulting from the assembly step of FIG. 2 is depicted in FIG. 3.

Figure 4:
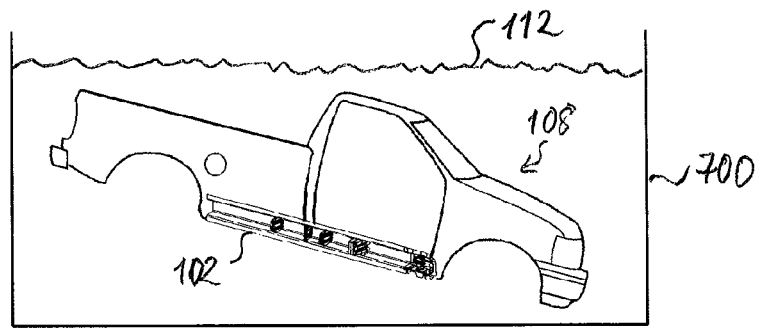
FIG. 4 is a schematic side view of an automobile body according to one form of the present disclosure, which includes the side sill of FIG. 3, while undergoing a paint immersion step of the manufacturing method.

After manufacturing of the hybrid side sill 102 has completed, the hybrid side sill 102 is assembled with additional parts into an automobile body 108 shown in FIG. 4 by making use of the mounting features in the terminal part 104 and/or in one or more of the metal brackets 106. For example, the terminal part 104 and/or one or more of the metal brackets 106 may be welded or screwed to other parts of the automobile body 108. FIG. 4 shows the automobile body 108 resulting from the automobile body assembly step while undergoing a subsequent paint immersion step of the method for manufacturing the automobile body. In the paint immersion step, the automobile body 108 including the hybrid side sill 102 is lowered into a paint tank 700 to be immersed in liquid paint 112 contained in the paint tank 700. After complete immersion, the automobile body 108 is pulled out of the paint tank 700.

Figure 5:
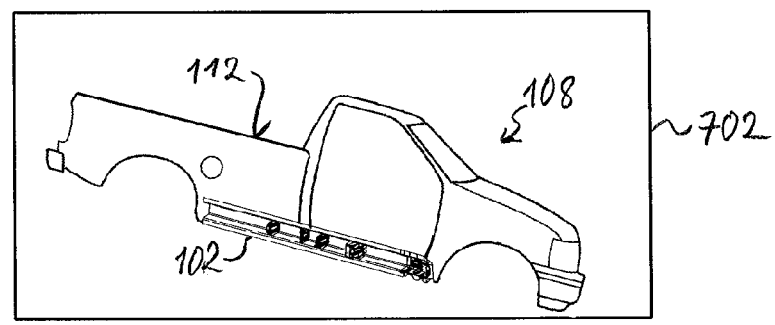
FIG. 5 is a schematic side view of the automobile body of FIG. 4, while undergoing a paint baking step of the manufacturing method.

FIG. 5 is a schematic side view of the automobile body 108 of FIG. 4 while undergoing a subsequent paint baking step of the manufacturing method. In the paint baking step, the automobile body 108 covered with paint 112 is placed within a baking oven 702 wherein a prescribed baking temperature of 190° C. is maintained for a prescribed baking period.

Figure 6:
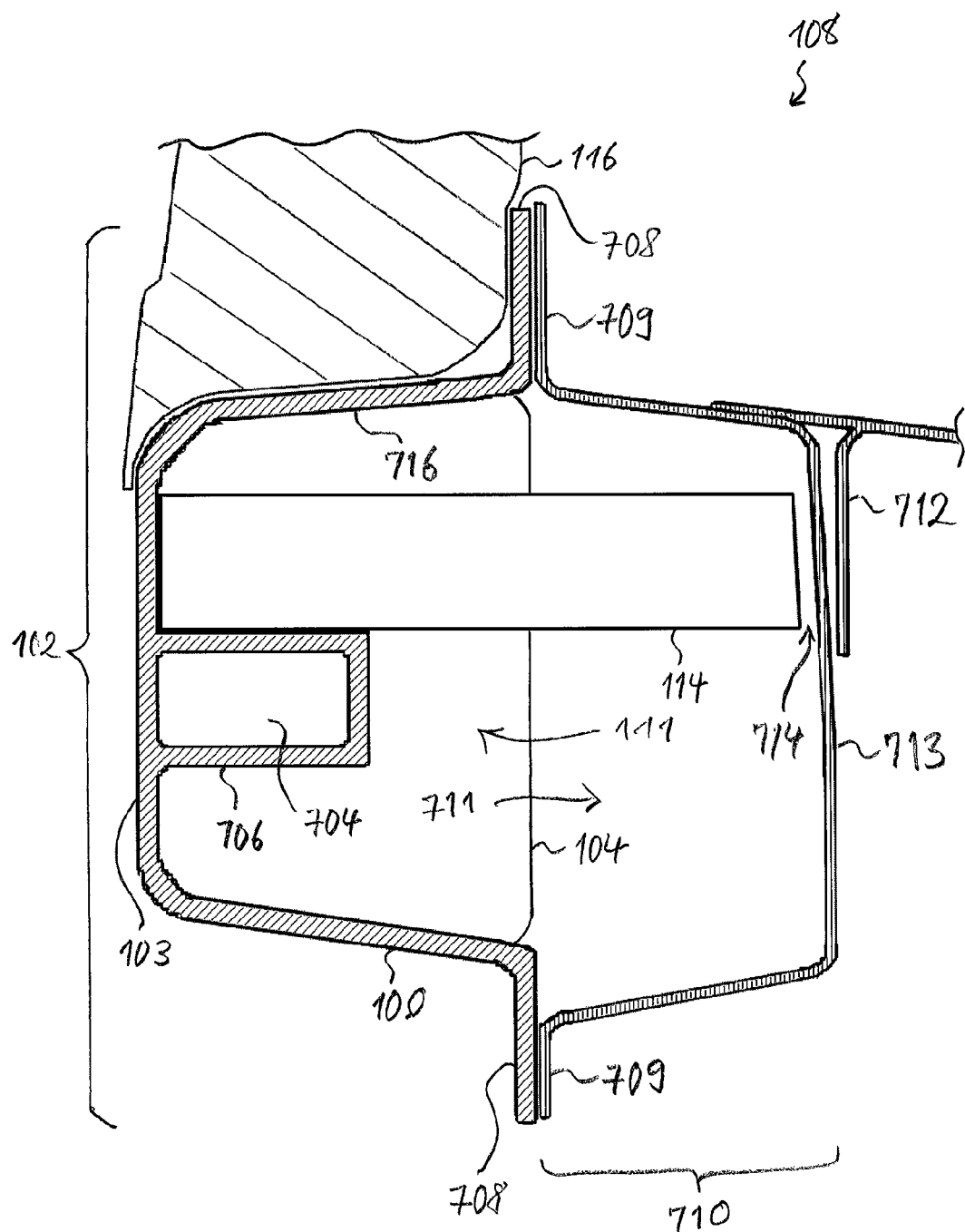
FIG. 6 is a schematic cross sectional view of a side sill, according to another form of the present disclosure, assembled as part of an automobile body in a manufacturing method according to one form of the present disclosure.

FIG. 6 is a schematic cross sectional view of another hybrid side sill 102 in a state assembled as part of an automobile body 108, with a portion of an automobile door 116 in closed condition being also shown. FIG. 6 shows only a portion of the automobile body 108 in the vicinity of the hybrid side sill 102. While the pultruded profile part 100 of the hybrid side sill 102 comprises a basically Ω-shaped cross-section as in the form of FIG. 3, in addition a hollow profile portion 706, which encloses an internal rectangular void 704 and protrudes into of the convex profile portion 111 from an outer wall 103 thereof, is formed in the cross section. In the present form, the closed formation of the hollow profile portion 706 provides the hybrid side sill 100 with greater inertia and torsion resistance, thus enabling a high overall performance of the hybrid side sill 102.

The hybrid side sill 102 is mounted to an Ω-shaped profile steel bracket 710 of the automobile body 108 by gluing foot sections 708 of the pultruded profile part 100 of the hybrid side sill 102 to foot sections 709 of the Ω-shaped profile steel bracket 710, using e.g. one-component epoxy glue, in such a way that the convex profile portion 111 of the pultruded profile part 100 combines with an opposing convex profile portion 711 of the Ω-shaped profile steel bracket 710 into a combined internal space 111, 711. The Ω-shaped profile steel bracket 710 in turn is attached by welding to further steel parts 712 of the automobile body 108. An upper side wall 716 of the pultruded profile part 716 forms a top surface of the hybrid side sill 102, which in a complete automobile is faced by a bottom surface of the automobile door 116 in closed condition.

Furthermore, a cylindrically-shaped crash can 114, which is separately manufactured by pull-winding or pullbraiding from a continuous fiber reinforced thermoplastic polymer having a heat deflection temperature of at least 200° C. is glued to the hollow profile portion 706 and the outer wall 103 of the convex profile portion 111 of the pultruded profile part 100 of the hybrid side sill 102 such as to extend from the outer wall 103 of the of the pultruded profile part 100 of the hybrid side sill 102 to almost an opposing inner wall 713 of the of the Ω-shaped profile steel bracket 710, leaving only a small gap 714 in-between. In the event of a side crash of the automobile, the crash can 114 absorbs crash energy by being gradually deformed as the outer wall 103 of the pultruded profile part 100 of the hybrid side sill 102 is pushed towards the inner wall 713 of the of the Ω-shaped profile steel bracket 710.

The cylindrical shape of the crash can 114 may have a circular cross section, a rectangular cross-section, an elliptical cross-section or the like. Furthermore, the crash can is not limited to a cylindrical shape but may also e.g. be formed with multiple cavities that extend in parallel across the internal space 111, 711. Also, in alternative forms the crash can 114 may be manufactured from a metal such as steel, or by injection molding from a thermoplastic polymer with or without glass fibers of short length added. The injection molding may be performed separately from the pultruded profile part 100, or as an overmolding step wherein the crash can 114 is attached and formed in-place as an overmolded element on the pultruded profile part 100.

Moreover, elements of the hybrid side sill 102 of FIG. 6 may be combined with elements of the forms described above without departing from the present disclosure. For example, crash cans 114 may be mounted in a pultruded profile part 100 of plain Ω-shaped cross-section, or metal brackets 106 may be mounted in a pultruded profile part 100 as shown in FIG. 6.

It is intended that the foregoing detailed description be regarded as illustrative rather than limiting, and that it be understood that it is the following claims, including all equivalents, that are intended to define the spirit and scope of this invention.

What is claimed is:

1. A hybrid side sill for an automobile, comprising:
   a pultruded profile part comprising a continuous fiber reinforced thermoplastic polymer, which has a heat deflection temperature of at least 200°C.; and
   a terminal part comprising steel, which is attached to an end portion of the pultruded profile part.

2. The hybrid side sill according to claim 1, wherein the continuous fiber reinforced thermoplastic polymer has a heat deflection temperature of at least 220° C.

3. The hybrid side sill according to claim 1, wherein the continuous fiber reinforcement thermoplastic polymer has a heat deflection temperature of at least 230°C.

4. The hybrid side sill according to claim 1, wherein the thermoplastic polymer comprises a semi-aromatic polyamide.

5. The hybrid side sill according to claim 1, wherein the thermoplastic polymer comprises a polyphthalamide.

6. The hybrid side sill according to claim 1, wherein the terminal part is glued to the pultruded profile part.

7. The hybrid side sill according to claim 1, wherein the terminal part is glued to the pultruded profile part by using a one-component epoxy glue.

8. The hybrid side sill according to claim 1, further comprising at least one metal bracket attached to the pultruded profile part.

9. The hybrid side sill according to claim 8, wherein said at least one metal bracket is placed within a convex profile portion of the pultruded profile part.

10. The hybrid side sill according to claim 1, wherein at least one crash can comprising at least one of steel or a thermoplastic polymer is attached to the pultruded profile part.

11. An automobile body comprising the hybrid side sill according to claim 1, the automobile body being covered with a paint layer baked at a baking temperature of at least 190°C.

* * * * *